W. H. Tillou,

Hames Fastener.

No. 98,315.  Patented Dec. 28, 1869.

Witnesses:
A. Bennerkendorf
Alex F. Roberts

Inventor:
W. H. Tillou
per Munn & Co.
Attorneys

United States Patent Office.

WILLIAM H. TILLOU, OF LE ROY, NEW YORK.

Letters Patent No. 98,315, dated December 28, 1869.

IMPROVED HAMES-FASTENER.

The Schedule referred to in these Letters Patent and making part of the same.

*To all whom it may concern:*

Be it known that I, WILLIAM H. TILLOU, of Le Roy, in the county of Genesee, and State of New York, have invented a new and useful Improvement in Hames-Fastener; and I hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish an improved fastener, by means of which the ends of the hames may be conveniently drawn into place and securely held and locked; and It consists in the fastener, constructed as hereinafter more fully described.

The fastener is made in three parts, A, B, and C.

The part A is made with a hook, $a'$, upon its outer end, to hook into the ring, eye, or loop, at the end of one of the hames. The part A is slotted from its other end, to receive the other parts, and has several holes formed in its slotted end, to receive the pivoting-pin, so that the fastener may be lengthened or shortened, as desired.

The part B has a hook, $b'$, formed upon its outer end, to hook into the ring, eye, or loop, attached to the end of the other hame.

To the other end of the part B is hinged the end of the third part or lever C, which is pivoted to the slotted end of the part A, by a pin, screw, or bolt, passing through a hole in the said part C, and through one or the other of the holes through the said part A.

One or the other of the hooks $a'$ $b'$ may be provided with a spring, D, to prevent it from becoming detached from the hames, when unfastened.

The parts A, B, and C are so formed, that when fastened, the line of draught may be in such a direction as to hold the fastener securely locked.

Figure 1:
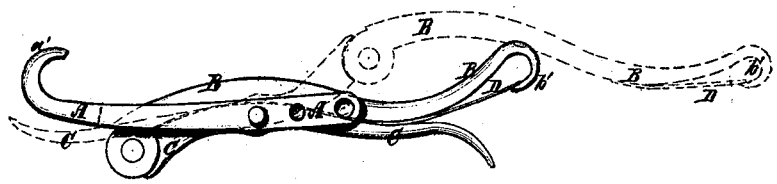
Figure 1 is a side view of my improved fastener.
Figure 2:
Figure 2 is a view of the upper side of the same.

In using the fastener, it is extended, as shown in dotted lines in fig. 1. The hooks $a'$ $b'$ are then hooked upon the hames, and the lever C is brought into the position, shown in full lines in fig. 1, drawing the hooked ends of the parts A B toward each other, and securely locking the fastener.

The only effect of a strain upon the hames is to hold the fastener more firmly locked.

Having thus described my invention,

I claim as new, and desire to secure by Letters Patent—

A hames-fastener, provided with slotted piece A, having hook $a'$ at one end, and perforations through its sides at the other end, so that the fastener may be lengthened or shortened, without changing the leverage, substantially as shown and described.

WILLIAM H. TILLOU.

Witnesses:
S. F. CURTISS,
G. G. ELMORE.